(12) United States Patent
Worthington

(10) Patent No.: US 7,588,274 B2
(45) Date of Patent: Sep. 15, 2009

(54) BUILDING BLOCK LIFTING AND CARRYING TOOL

(76) Inventor: Landon Worthington, 694 Benson Way, Thousand Oaks, CA (US) 91360

( * ) Notice: Subject to any disclaimer, the term of this patent is extended or adjusted under 35 U.S.C. 154(b) by 335 days.

(21) Appl. No.: 11/456,011

(22) Filed: Jul. 6, 2006

(65) Prior Publication Data

US 2007/0022674 A1 Feb. 1, 2007

Related U.S. Application Data

(60) Provisional application No. 60/697,109, filed on Jul. 6, 2005.

(51) Int. Cl.
*E04G 21/14* (2006.01)
*B65G 7/12* (2006.01)

(52) U.S. Cl. .............. 294/62; 52/DIG. 1; 52/749.13; 294/15

(58) Field of Classification Search .............. 52/749.13, 52/DIG. 1; 294/16, 62, 15, 89, 92
See application file for complete search history.

(56) References Cited

U.S. PATENT DOCUMENTS

| | | | | | |
|---|---|---|---|---|---|
| 277,532 | A | * | 5/1883 | Ash .............................. | 294/89 |
| 796,642 | A | * | 8/1905 | Hall ............................. | 294/16 |
| 801,342 | A | * | 10/1905 | Schultz ........................ | 294/16 |
| 813,060 | A | * | 2/1906 | Rowell ......................... | 294/16 |
| 820,946 | A | * | 5/1906 | Balzer ......................... | 294/62 |
| 830,840 | A | * | 9/1906 | Kline ........................... | 294/16 |
| 981,365 | A | * | 1/1911 | Birnie et al. .................. | 294/89 |
| 1,495,179 | A | * | 5/1924 | Hoffer ......................... | 294/16 |
| 2,347,310 | A | * | 4/1944 | Zuber .......................... | 294/15 |
| 2,409,932 | A | * | 10/1946 | Dostal ......................... | 294/15 |
| 2,541,863 | A | * | 2/1951 | Deans et al. .................. | 294/62 |
| 2,652,278 | A | * | 9/1953 | Allen ........................... | 294/15 |
| 2,808,286 | A | * | 10/1957 | Lyon ........................... | 294/62 |
| 2,821,426 | A | | 1/1958 | Hanner | |
| 2,823,948 | A | * | 2/1958 | Horton ........................ | 294/97 |
| 2,967,730 | A | * | 1/1961 | Vann ........................... | 294/62 |
| 2,968,510 | A | * | 1/1961 | Ellis et al. ..................... | 294/62 |
| 3,237,979 | A | | 3/1966 | Moody | |
| 4,223,935 | A | | 9/1980 | Rayner et al. | |
| 4,460,210 | A | * | 7/1984 | Miechur ...................... | 294/97 |
| 4,463,979 | A | * | 8/1984 | Lybolt ......................... | 294/62 |
| 4,632,442 | A | * | 12/1986 | Gerding ....................... | 294/16 |
| 4,705,312 | A | * | 11/1987 | Vooge et al. .................. | 294/62 |
| 4,982,987 | A | * | 1/1991 | Riggins et al. ................ | 294/62 |

(Continued)

*Primary Examiner*—Robert J Canfield
*Assistant Examiner*—Charissa Ahmad
(74) *Attorney, Agent, or Firm*—Kelly, Lowry & Kelley, LLP

(57) ABSTRACT

A tool for lifting and carrying a building block includes a body having a first end adapted to engage an inner building block wall. A nose extends from an upper portion of the first end and is adapted to engage an upper surface of the building block. First and second elongated legs extend away from the first end in angular relation to one another. A foot is pivotally connected to a free end of the second leg, and has a generally parallel pad portion configured to engage an opposite inner wall of the building block. Upon exerting a lifting force on a handle portion of the first leg, the first end of the body and the foot pad engage and exert opposing forces to opposite inner walls of the building block cell, enabling the building block to be lifted by the tool.

19 Claims, 2 Drawing Sheets

U.S. PATENT DOCUMENTS

| | | |
|---|---|---|
| 5,039,150 A | 8/1991 | Jones et al. |
| 5,509,706 A | 4/1996 | Thalmann |
| 6,386,608 B1 | 5/2002 | Eister |
| 7,066,512 B2 * | 6/2006 | Harris et al. .................. 294/97 |
| 2003/0038493 A1 * | 2/2003 | Harris et al. .................. 294/97 |

* cited by examiner

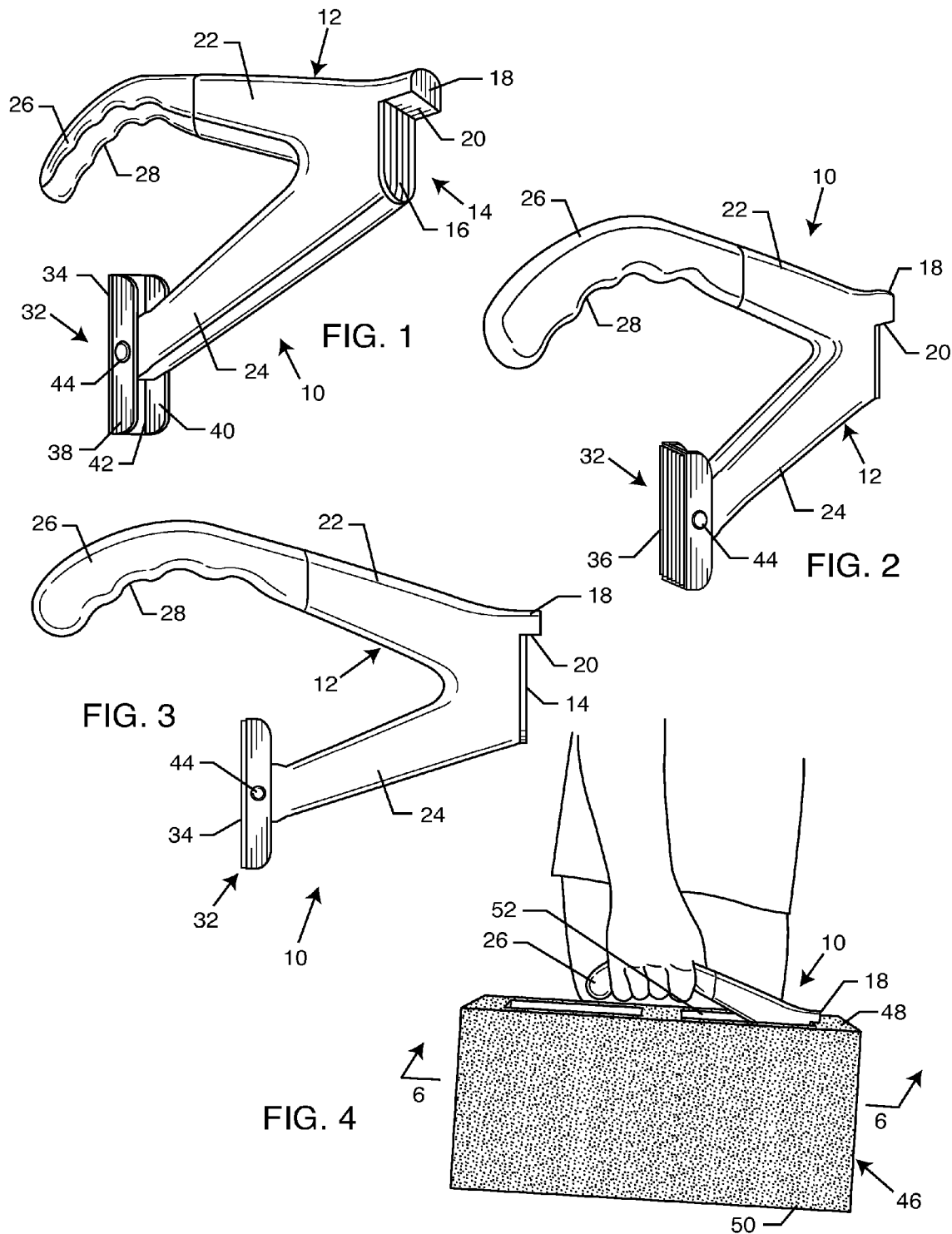

BUILDING BLOCK LIFTING AND CARRYING TOOL

BACKGROUND OF THE INVENTION

The present invention generally relates to hand tools for use in the construction and building industry. More particularly, the present invention relates to a hand tool suitable for use in lifting and carrying building blocks, such as those made of concrete or cinder and having apertures, referred to as open cells, therethrough.

The traditional building block is the familiar brick which is small enough to be handled manually without difficulty. However, with the advent of larger blocks, such as cinder or concrete blocks, the relative size of the block makes it difficult to handle the blocks with a single hand, and in consequence both hands must be used to lift the block onto mortar on the end or top of the wall being built. Of course, this is undesirable as the mason would prefer to have the trowel or other tool in one hand while positioning the block with the other.

Without the use of a tool, the mason or workman must pick up the block directly from a flat surface, such as the ground or a stack of such blocks, requiring the worker to stoop and get his fingers under the block in order to lift it. Such blocks are not only relatively heavy, but have very rough surfaces. This can damage bare hands over time. Even when hands are protected by gloves, the gloves are susceptible to rapid wear.

Accordingly, there have been devised a variety of tools for lifting such blocks. For example, U.S. Pat. No. 4,982,987 to Riggins et al., discloses a masonry block tool for picking up and transporting masonry blocks. However, the worker must use a pair of cross-handle members, one in each hand, in order to lift and carry a single block.

U.S. Pat. Nos. 2,652,278; 2,821,426; and 3,237,979 all disclose hand tools for lifting and carrying such blocks. However, these tools grasp the block by frictional engagement between an outer surface of the block and an inner surface within the cell, or a cross-member of the block between two cells. Problems presented with such devices are that the wall thickness of these blocks is not consistent. Thus, these devices include relatively complicated mechanisms for adjusting the device to fit the various widths of the various blocks used. Of course, this presents increased manufacturing costs, as well as increased complication in using the tool.

U.S. Pat. Nos. 2,347,310 and 2,409,932 disclose building block lifters having a handle and a non-movable portion insertable into the open cell of the building block. This is wedged between two walls defining the open cell, so as to enable the building block to be lifted by the worker. However, once such prior type tools are wedged in place, it is often difficult to remove them without damaging the block. Such damage, usually in the form of chipping, cause areas of weakness, which later on, after a period of use, undermine the strength of the entire block.

U.S. Pat. No. 2,808,286 discloses a cement block handling tool having movable and adjustable members so as to selectively lock and release the tool from the cement block, providing benefits over the prior art. However, the tool includes a movable plate and screws which must be adjusted for each type of block in order to securely hold and lift the block. Moreover, a wedge dog member, which pivots to engage the opposite surface of the cinder block, comes to a fairly sharp point. Thus, the cement block is held in place by contact of the ends of two bolts, and a pointed end of the dog wedge member, creating an insufficient frictional engagement. The sharp points can also dig into the relatively soft cinder or cement walls, damaging the cinder blocks and making removal of the tool difficult.

U.S. Pat. No. 4,463,979 discloses a building block handling tool as well. This tool is comprised generally of a U-shape member at the end of a handle which is inserted into an open cell of the cinder block. A plate is pivotally attached to the end of the member and deflected upwardly, depending upon the size of the cell. A curved portion of the member engages one inner side wall, and the edge of the plate, or edge of the member, engages the opposite side wall. However, this presents the problem of an insufficient frictional engagement with the side wall, and the potential for the sharp edge to dig into the cinder or concrete material, making removal of the tool difficult without damaging the block. Moreover, when the tool is inserted into the block's open cell, the handle is positioned at a very awkward upwardly directed carrying angle.

Another shortcoming of the aforementioned hand tools is that the cinder and concrete building blocks have changed in configuration over time. Instead of including three open cells, the newer cinder blocks only include two open cells. While the width of the building blocks vary from four inches to twelve inches (typically 4", 8", 10" and 12"), and the thicknesses of the side walls can vary significantly, the length of the open cells have been found to be fairly consistent, with less than one-inch of variation between the major manufacturers.

Accordingly, there is a continuing need for a hand tool for lifting and carrying cinder and concrete building blocks. Such a hand tool should be configured and designed to accommodate the newer cinder blocks. Such a hand tool should also be relatively simple in design so as to be manufactured inexpensively and easily used. Such a hand tool should adequately frictionally engage the cinder block for lifting and carrying. Such a hand tool should also be adapted for lifting and carrying cinder blocks of different sizes. Such a hand tool should also be comfortably used by a mason or worker. The present invention fulfills these needs, and provides other related advantages.

SUMMARY OF THE INVENTION

The present invention resides in a hand tool for lifting and carrying cinder and concrete building blocks, such as the newer varieties that have at least one cell, or aperture, therethrough. More particularly, such building blocks have open cells of generally uniform length defined by opposing inner walls. The building block also has upper and lower surfaces.

The tool of the present invention generally comprises a body having a first end adapted to engage an inner building block wall. The first end of the body defines a generally planar pad, which typically includes a frictionally gripping material attached thereto.

A nose extends outwardly from an upper portion of the first end, and is adapted to engage the upper surface of the building block. A lower surface of the nose and the first end of the body are angularly offset from one another by approximately ninety degrees.

First and second elongated legs extend away from the first end in angular relation to one another. As such, the body has a generally V-shaped configuration. The first leg includes a handle formed at an end thereof. Preferably, finger receiving grooves are formed in the lower surface of the handle portion of the first leg.

A foot is pivotally connected to a free end of the second leg, and has a generally planar pad portion configured to engage an opposite inner wall of the building block at the first end of the body. In a particularly preferred embodiment, the foot includes generally parallel walls extending from the pad and forming a channel configured to receive an end of the second leg therein. A pin extends through at least one of the walls of the foot and into the second leg such that the foot is pivotally connected to the second leg. In a particularly preferred embodiment, frictionally gripping material is attached to the generally planar pad of the foot generally opposite the walls.

The second leg is inserted into a cell of the building block until the nose engages the upper surface of the building block. Upon exerting a lifting force on the first leg, the first end of the body engages the inner wall of the building block and the foot simultaneously engages the opposite inner wall of the building block so as to exert opposing forces to the opposite inner walls of the building block cell, enabling the building block to be lifted by the tool and carried by the user.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a front perspective view of a tool embodying the present invention;

FIG. 2 is a rear perspective view of the tool of FIG. 1;

FIG. 3 is a side elevational view of the tool of FIG. 1;

FIG. 4 is a diagrammatic view illustrating the tool of the present invention used to lift a building block;

DETAILED DESCRIPTION OF THE PREFERRED EMBODIMENTS

Figure 5:
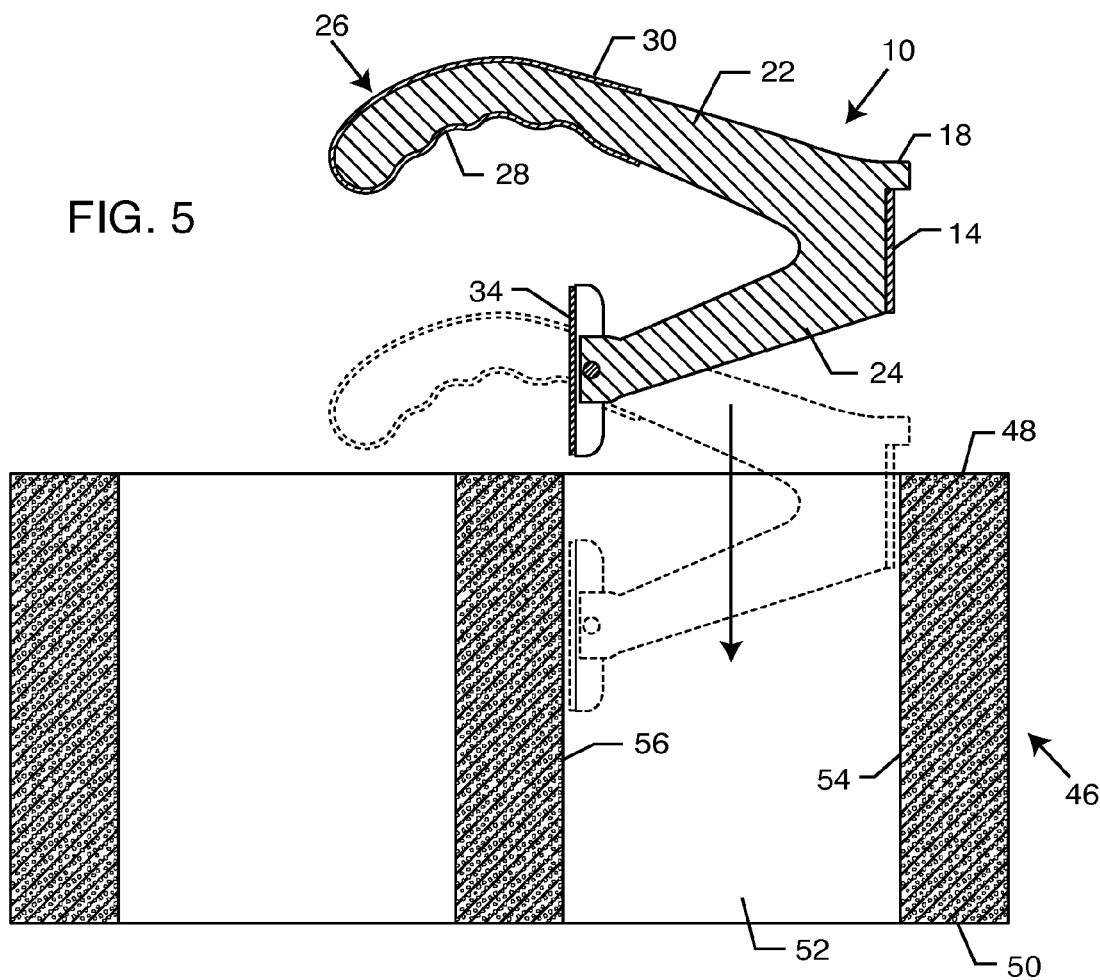
FIG. 5 is a cross-sectional view illustrating insertion of the tool of the present invention into a cell of the building block, in accordance with the present invention.

As shown in the drawings, for purposes of illustration, the present invention resides in a tool, generally referred to by the reference number 10, which aids a worker in lifting, carrying and setting concrete or cinder building blocks. As will be more fully described herein, this tool is a simple design which is inexpensive to manufacture, easy to use, lightweight and quick to implement while being un-obtrusive to allow the user to "set" the building block into place, without first having to remove the tool 10 from the block. Further, this tool 10 aids the user in placing the block level with just one hand. The design of the tool 10 of the present invention enables it to carry all commonly used standard concrete and cinder blocks ranging from four inches to twelve inches in width.

The term "building block" as used herein is intended to refer to any building block having open cells therein. Such cinder or concrete blocks are well-known and commonly used in the construction industry, such as, for example, building cinder block fences, walls, etc. These blocks are stacked upon one another and held together with mortar and cement or the like. Usually, metal rebar extends through the open cells thereof and cement is used to fill the open cells to create a very sturdy wall. As discussed above, current major manufacturers of cinder or cement blocks create building blocks which may vary from four to twelve inches in width as well as the thickness of the side walls, however, the length of the apertures or open cells have been found to be fairly consistent, with less than one-inch of variation between the major manufacturers.

With reference now to FIGS. 1-3, the tool pin includes a generally V-shaped body 12 that is typically comprised of molded plastic, but could be comprised of other materials, such as wood, metal or other such sturdy material. The body 12 has a first end or face 14 defining a generally planar pad. In a particularly preferred embodiment, the first end has a frictionally gripping material 16 attached to the first end pad 14 for gripping an inner surface or wall of the cinder block, as will be more fully discussed herein. Such gripping material 16, for example, could comprise a rubber material or the like affixed to the face.

A nose 18 extends outwardly from the upper portion of the first end 14, and includes a lower surface 20 which is adapted and configured to engage an upper surface of the building block, as will be discussed more fully herein. As shown in FIG. 3, the lower surface 20 of the nose 18 and the first end pad 14 are angularly offset from one another by approximately ninety degrees.

The body 12 includes two legs 22 and 24 which extend away from the first end pad in angular relation to one another, thus forming the V-shape configuration of the body 12. The first leg 22 has a handle 26 formed at an end thereof. The handle 26 preferably includes indentations or figure-receiving grooves 28 formed in a lower surface of the handle portion 26. The handle portion 26 of the first leg 22 may also include a cushion or grip material 30 so as to provide grip and comfort to the user when operating the tool. It will be appreciated by those skilled in the art that the handle portion 26 of leg 22 is typically just a molded extension of leg 22. Preferably, the handle portion 26 of leg 22 is curved, such that it is generally parallel to the building block when in use, as illustrated in FIG. 4. A curved handle portion 26 also sufficiently positions the handle portion 26 from the upper surface of the building block such that the worker can grasp the handle without scraping his or her knuckles on the upper surface of the block, as illustrated in FIG. 4.

With reference again to FIGS. 1-3, a foot 32 is pivotally attached to an end of the second leg 24. The foot 32 includes a generally planar pad portion 34 which may be lined with or have attached thereto a frictionally gripping material, such as an elastomeric pad 36. The pad portion 34 is configured to engage an opposite inner wall of the building block and frictionally engage therewith, as will be discussed more fully herein. In a particularly preferred embodiment, the foot 32 includes generally parallel walls 38 and 40 extending from the pad portion 34, generally opposite the gripping material 36. The generally parallel walls 38 and 40 form a groove 42 which receives a free end of the second leg 34 therein. A pin 44 extends at least through one wall 38, and preferably both walls 38 and 40, and into or through the end of the second leg 24, such that the foot 32 is pivotal with respect to the end of the second leg 24. The pivoting nature of foot 32 allows the foot 32 and second leg 24 to be inserted into a cell of the building block while enabling the tool 10 to frictionally engage and lift the cinder block, as will be discussed more fully herein. Moreover, the pivoting nature of the foot 32 also accommodates for cell lengths that may vary from manufacturer to manufacturer by a fraction of an inch.

Figure 6:
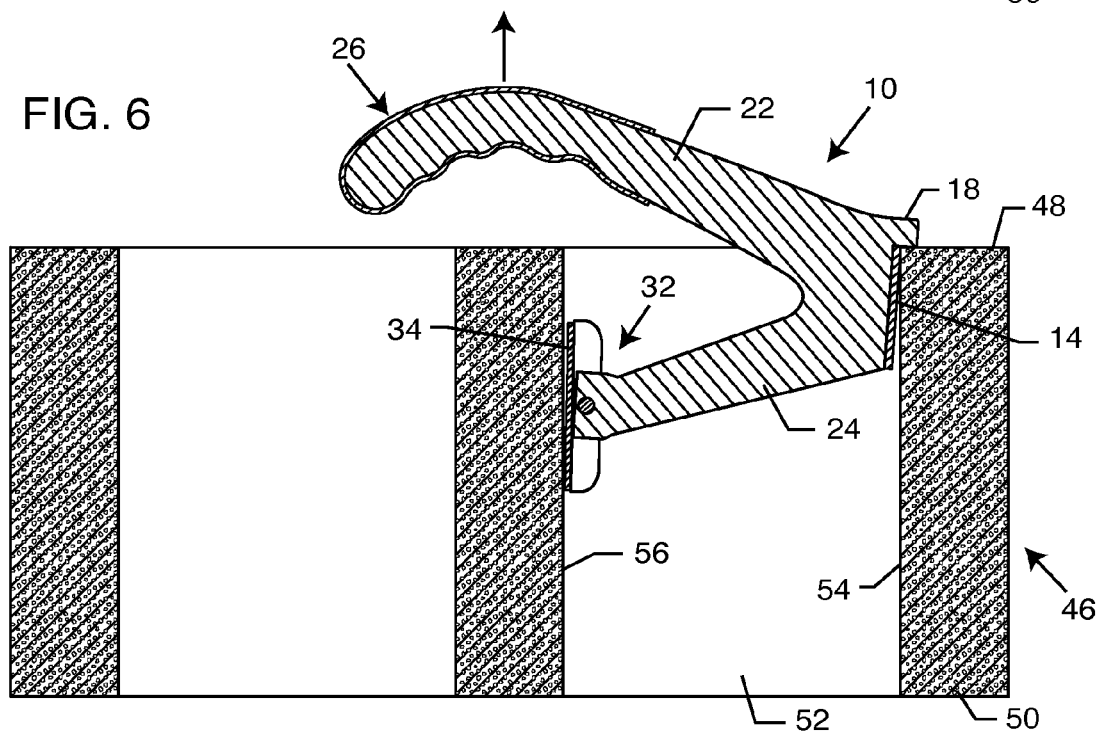
FIG. 6 is a cross-sectional view taken generally along lines 6-6 of FIG. 4, illustrating the tool of the present invention gripping and lifting the concrete building block.

With reference now to FIGS. 4-6, the tool 10 of the present invention is configured to engage and enable the user to lift and carry the building block 46. The building block 46, as described above, is typically comprised of cinder or cement material and have upper and lower surfaces 48 and 50 and have at least one cell or aperture 52 formed therein. Each cell 52 is defined by four inner walls, opposing inner walls 54 and 56 forming the length dimension of the cell being pertinent to the present invention.

With reference now to FIGS. 5 and 6, the tool 10 is lowered into a cell 52 of the building block 46 until the second leg 24, the end face pad 14, and the foot 32 are disposed within the cell 52. The lower surface 20 of the nose 18 will engage the upper surface 48 of the building block 46 and act as a guide or stop the depth of the insertion of the tool 10 into the cinder block open cell, as well as engaging an upper surface of the block 48 to facilitate carrying and transporting of the block 46. The building block 46 typically includes multiple cells, such as the two cells 52 in the building block 46 illustrated herein, the tools 10 of the present invention may be inserted into either cell, but is preferably inserted into the forward most cell 52 for ease of use.

With reference now to FIG. 6, after the tool 10 has been inserted into the cell 52 and the nose 18 engages the upper surface 48 of the building block 46, the handle portion 26 of the first leg 22 is lifted upwardly so as to exert a lifting force. This pivots the body 12 slightly, causing at least a portion of the front end face pad 14 to engage inner wall 54 of the cell 52. Simultaneously, the pad portion 34 of the foot 32 pivots into engagement with the opposite inner wall 56 of the cell 52, exerting opposite forces to the opposing inner surfaces 54 and 56. The generally planar nature of the front end face pad 14 and foot pad 34 render a high degree of engagement with the inner walls 54 and 56. The gripping material 16 and 36 on the pads 14 and 34, respectively, also can significantly increase the frictional engagement with the opposing walls 54 and 56, and further serve to prevent any damage being done to the building block 46. With the handle 26 lifted upwardly and the pads 14 and 34 engaging inner walls 54 and 56, the building block 46 can be lifted and carried quite easily, as shown in FIG. 4. As illustrated in FIG. 4, the worker is able to hold the tool 10 in a very natural position with his or her arm generally perpendicular to the primary axis of the building block 46 so as to lessen the strain on the worker's hand and arm.

It will be appreciated by those skilled in the art that due to the relatively large and planar surfaces presented by the end face pad 14 and the generally planar pad 34 of the pivotal foot 32 provide a high degree of frictional engagement with the building block 46. As mentioned above, foot 32 pivots into engagement with the opposite surface 56 of the open cell 52 when the handle 26 is lifted upwardly. However, typically a relatively large area of engagement still occurs between the wall 56 and the pad 34. The pivoting nature of foot 32 enables the tool 10 to be used with different blocks wherein the length of the cell 52 varies by a fraction of an inch from manufacturer to manufacturer. Thus, in some cases, nearly the entire pad 34 of foot 32 will be in engagement with wall 56. However, in other cases, only a portion of pad 34 will be in engagement with the surface of wall 56.

It will be appreciated by those skilled in the art that two building blocks 46 could be lifted and carried simultaneously, one in each hand of the worker, using two tools 10 of the present invention. Alternatively, the worker could lift and carry a single block 46 using the tool 10, and have the other hand free, such as for operating a masonry trowel or the like.

When the building block 46 is to be set or laid, the building block is positioned using the tool 10. The design and configuration of the tool 10 enable the building block 46 to be positioned over rebar as well. This is due to the fact that the tool 10 is very slender in design so as not to occupy too much space of the open cell 52. When the upward force is removed from the handle 26, the tool 10 can be removed from the open cell of the building block 46.

Although an embodiment has been described in detail for purposes of illustration, various modifications may be made without departing from the scope and spirit of the invention. Accordingly, the invention is not to be limited, except as by the appended claims.

What is claimed is:

1. A hand-held tool for manually lifting and carrying with one hand a single building block having an upper surface and opposing inner walls defining a cell formed therein, the tool comprising:

a generally V-shaped body having a first end defining a generally planar pad adapted to engage an inner building block wall, a nose extending from an upper portion of the first end and adapted to engage the upper surface of the building block adjacent to the inner building block wall engaged by the first end of the body, and first and second elongated legs extending away at an acute angle from one another, the first leg defining a handle, and the second leg configured to be disposed within the cell of the block and extend substantially the distance between opposing walls thereof; and a foot pivotally connected to a free end of the second leg and having a generally planar pad portion configured to engage an opposite inner wall of the building block as the first end of the body;

whereby the second leg is inserted into the cell of the building block until the nose engages the upper surface of the building block, and upon exerting a lifting force on the first leg, the first end of the body engages the inner wall of the building block and the foot engages the opposite inner wall of the building block so as to exert opposing forces to the opposite inner walls of the building block enabling the building block to be manually lifted by the tool.

2. The tool of claim 1, including a frictionally gripping material attached to the pad.

3. The tool of claim 1, wherein the first end of the body and a lower surface of the nose are angularly offset from one another by approximately ninety degrees.

4. The tool of claim 1, wherein the first leg includes a handle formed at an end thereof.

5. The tool of claim 4, including finger receiving grooves formed in a lower surface of the handle portion of the first leg.

6. The tool of claim 1, wherein the foot includes generally parallel walls extending from the pad and forming a channel configured to receive an end of the second leg therein.

7. The tool of claim 6, including a pin extending through at least one of the walls of the foot and into the second leg such that the foot is pivotally connected to the second leg.

8. The tool of claim 1, including a frictionally gripping material attached to the generally planar pad of the foot.

9. A hand-held tool for manually lifting and carrying and placing with one hand a single building block having two cells therein, each cell defined by an upper surface and opposing inner walls, the tool comprising:

a body having a first end defining a generally planar pad adapted to engage an inner building block wall, a nose extending from an upper portion of the first end and having a lower surface adapted to engage the upper surface of the building block, the pad of the first end and the lower surface of the nose being angularly offset by approximately ninety degrees so as to engage adjacent portions of the upper surface and the inner wall of the building block, and first and second elongated legs extending away at an acute angle from one another such that the body has a generally V-shaped configuration, the first leg defining a handle at an end thereof and the second leg configured to be disposed within a cell of the block and extend substantially the distance between opposing walls thereof; and a foot pivotally connected an end of the second leg and having a generally planar pad portion configured to engage an opposite inner wall of the building block as the first end of the body, generally parallel walls extending from the pad portion and forming a channel receiving the end of the second leg therein, and a pin extending through the foot and into the second leg;

whereby the second leg is inserted into the cell of the building block until the nose engages the upper surface of the building block, and upon exerting a lifting force on the first leg, the first end of the body engages the inner wall of the building block and the foot engages the opposite inner wall of the building block so as to exert opposing forces to the opposite inner walls of the building block enabling the building block to be lifted by the tool.

10. The tool of claim 9, including a frictionally gripping material attached to the first end pad.

11. The tool of claim 9, including finger receiving grooves formed in a lower surface of the handle portion of the first leg.

12. The tool of claim 9, including a frictionally gripping material attached to the generally planar pad of the foot.

13. A hand-held tool for manually lifting and a single building block having two cells therein each defined by an upper surface and opposing inner walls, the tool comprising:

a body having a first end defining a generally planar pad adapted to engage a first inner building block wall, a first elongated leg extending away from the first end planar pad and defining a single handle, a second elongated leg extending away from the first end planar pad at an acute angle with respect to the first leg such that the body has a generally V-shaped configuration, the second elongated leg extending substantially the distance between the opposing first and second walls of the cell; and a foot pivotally connected to a free end of the second leg and having a generally planar pad portion configured to engage the second inner wall of the building block;

whereby the first end planar pad and the second leg are inserted into the cell of the building block, and upon exerting a lifting force on the first leg, the first end planar pad of the body engages the first inner wall of the building block and the foot engages the opposite second inner wall of the building block so as to exert opposing forces to the opposite first and second inner walls of the building block enabling the building block to be manually lifted by the tool with a single hand.

14. The tool of claim 13, including a frictionally gripping material attached to the first end planar pad.

15. The tool of claim 13, including a nose extending from an upper portion of the first end of the body, a lower surface of the nose configured to engage the upper surface of the building block.

16. The tool of claim 15, wherein the first end of the body and the lower surface of the nose are angularly offset from one another by approximately ninety degrees.

17. The tool of claim 13, wherein the foot includes generally parallel walls extending from the pad and forming a channel configured to receive an end of the second leg therein.

18. The tool of claim 17, including a pin extending through at least one of the walls of the foot and into the second leg such that the foot is pivotally connected to the second leg.

19. The tool of claim 13, including a frictionally gripping material attached to the generally planar pad of the foot.

* * * * *